No. 756,699. Patented April 5, 1904.

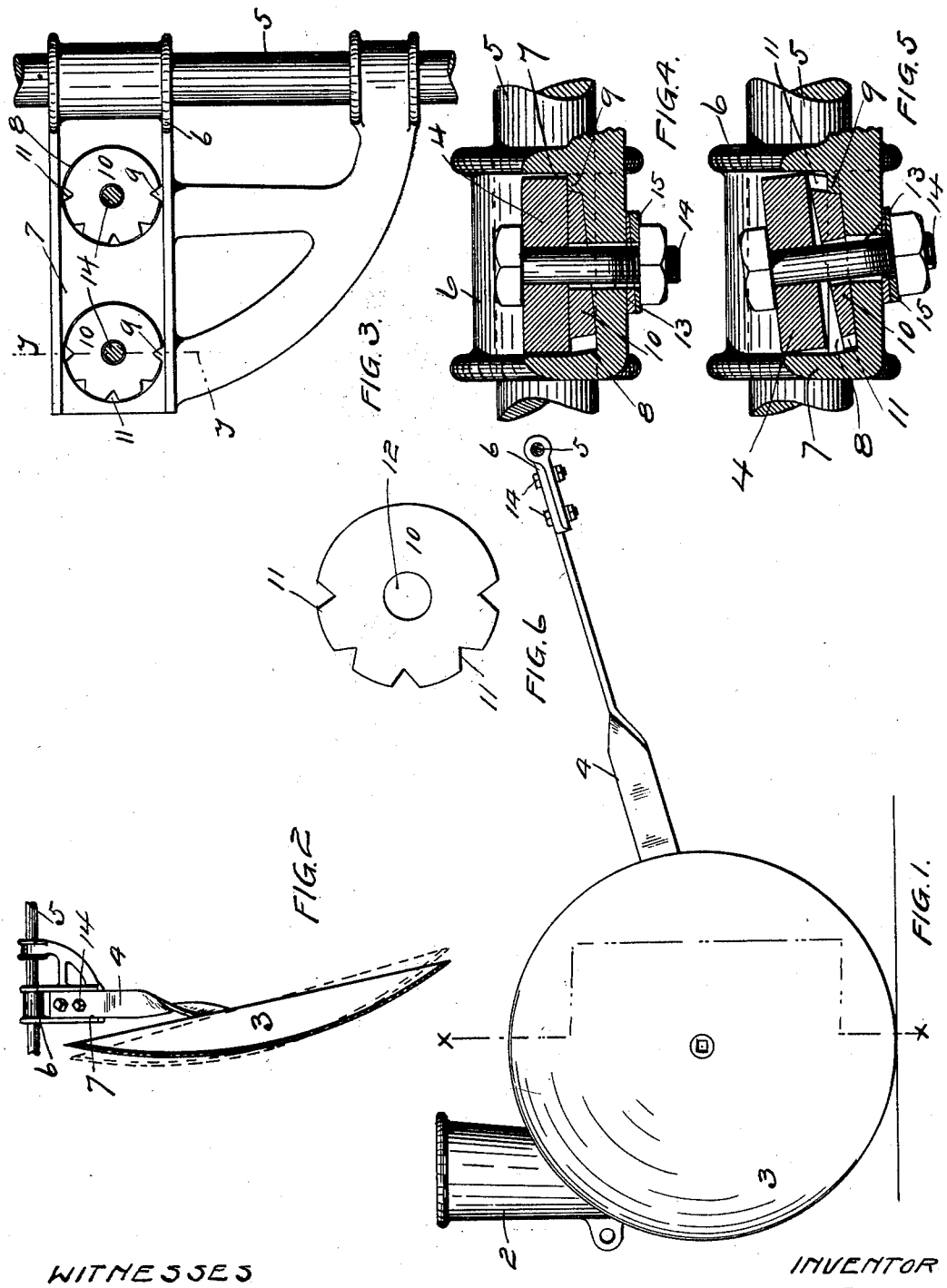

UNITED STATES PATENT OFFICE.

OCTAVE A. POIRIER, OF GLADSTONE, MINNESOTA.

ATTACHMENT FOR DISK DRILLS.

SPECIFICATION forming part of Letters Patent No. 756,699, dated April 5, 1904.

Application filed September 16, 1903. Serial No. 173,377. (No model.)

*To all whom it may concern:*

Be it known that I, OCTAVE A. POIRIER, of Gladstone, county of Ramsey, State of Minnesota, have invented certain new and useful Improvements in Attachments for Disk Drills, of which the following is a specification.

The object of my invention is to provide means for tilting a drill-disk on its vertical axis for the purpose of spreading the soil brought up on the surface of the disk evenly over the ground as the machine moves along.

Other objects of the invention will appear from the following detailed description.

The invention consists generally in various constructions and combinations, all as hereinafter described, and particularly pointed out in the claims.

In the accompanying drawings, forming part of this specification, Figure 1 is a side elevation of a drill-disk with my invention applied thereto. Fig. 2 is a sectional view on the line $x\ x$ of Fig. 1. Fig. 3 is a plan view of the means employed for connecting the disk drag-bar with the transverse draft-rod of the machine. Fig. 4 is a sectional view on the line $y\ y$ of Fig. 3. Fig. 5 is a similar view showing the parts adjusted to tilt the disk on its vertical axis. Fig. 6 is a detail of the notched disk interposed between the drag-bar and the draft-rod casting.

In the drawings, 2 represents the drill-boot, and 3 the disk mounted thereon.

4 is a drag-bar bolted to the boot and containing a twist or half-turn, so that the forward end of the drag-bar is in a plane substantially at right angles to its rear end.

5 is a transversely-arranged draft-rod whereon a casting 6 is mounted and provided with a channel-shaped socket 7, adapted to receive the forward end of the drag-bar. In the bottom of the channel 7 I provide circular depressions 8, that gradually decrease in depth from one side toward the other and on the high side are provided with lugs 9. Within these depressions I arrange movable disks 10, having a series, preferably four or more, of peripheral notches 11, that are adapted to receive the lugs 9 and be locked thereby against rotation in either direction. These disks are thicker on one side than the other to correspond to the recesses 8, and when adjusted with the thicker edges in the deeper side of the recesses the upper surfaces of the disks will be substantially flush with the bottom of the channel 7, so that the drag-bar will rest evenly thereon. Each disk 10 is provided with a centrally-arranged hole 12, registering with a corresponding hole 13 in the bottom of the channel 7, and bolts 14 are provided that pass through the end of the drag-bar and through the holes in the disks and channel, these latter holes being of sufficient size to allow lateral movement of the bolts therein and permit the same to be tilted when it is desired to vary the adjustment of the drag-bar and tilt the drill-disk on its vertical axis. Tapered washers 15 are provided on the bolts 14, which, being adjusted as the bolts are tilted, will bear evenly at all times on the under side of the channel 7.

The manner of using my invention is as follows: In Fig. 4 the drag-bar is shown in a position to support the drill-disk vertically; but if it is desired to tilt the drill-disk on its vertical axis the bolts 14 are loosened and the disks 10 revolved until the thicker edges thereof are on the shallow sides of the recesses, as shown in Fig. 5. The lugs 9 are then allowed to enter the notches according to the adjustment desired and lock the disks 10 against rotation, and upon tightening the burs on the bolts the drag-bar will be firmly held in its laterally-tilted position, causing the drill-disk to assume the position as indicated in Fig. 2.

The disks 10 can of course be varied in thickness, according to the degree of adjustment desired, and the peripheral notches may of course be increased or diminished in number to provide greater latitude of adjustment.

I claim as my invention—

1. The combination, with a drill-boot and the disks mounted thereon, of a drag-bar connected to said boot, a draft-rod, a member mounted thereon and having a socket to receive the forward end of said drag-bar, and a wedge-shaped member interposed between said forward end and said socket, for the purpose specified.

2. In a disk drill, the combination, with a draft-rod and a member mounted thereon, of a drag-bar secured to said member, and wedge-shaped means for tilting said drag-bar laterally, for the purpose specified.

3. In a disk drill, the combination, with a draft-rod and a member mounted thereon and provided with recesses gradually decreasing in depth from one side to another, of a draft-rod secured to said member, and disks decreasing in thickness from one side toward the other fitting within said recesses between said member and said drag-bar.

4. In a disk drill, the combination, with a draft-rod and an oscillating member mounted thereon provided with a recess gradually decreasing in depth from one side toward the other and having a lug, of a drag-bar secured to said member, a disk thicker on one edge than on the other and adapted to fit into said recess between it and said drag-bar and having a series of peripheral notches to receive said lug.

5. The combination, with a draft-rod and a member mounted thereon provided with a recess that is deeper on one side than on the other, a drag-bar, a disk having a thicker edge on one side than on the other and adapted to fit said recess and between it and said bar, and a bolt passing through said drag-bar and fitting loosely in holes provided in said disk and said member, substantially as described.

In witness whereof I have hereunto set my hand this 7th day of September, 1903.

OCTAVE A. POIRIER.

In presence of—
RICHARD PAUL,
S. V. GRIFFIN.